(12) United States Patent
Murata et al.

(10) Patent No.: US 6,695,427 B2
(45) Date of Patent: *Feb. 24, 2004

(54) MULTIFUNCTION DEVICE AND CONTROL METHOD FOR THE SAME

(75) Inventors: Sadao Murata, Okaya (JP); Kunio Omura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 10/177,401

(22) Filed: Jun. 19, 2002

(65) Prior Publication Data

US 2003/0001011 A1 Jan. 2, 2003

Related U.S. Application Data

(63) Continuation-in-part of application No. 09/987,435, filed on Nov. 14, 2001, which is a continuation-in-part of application No. 09/130,165, filed on Aug. 6, 1998, now Pat. No. 6,350,005.

(30) Foreign Application Priority Data

Aug. 6, 1997 (JP) .............................. 9-212259
Jun. 22, 2001 (JP) ....................... 2001-190298

(51) Int. Cl.[7] .......................................... B41J 29/393
(52) U.S. Cl. ........................................................ 347/19
(58) Field of Search ............................ 347/19, 14, 23, 347/12, 22, 10, 101, 104, 105, 5, 8; 400/568, 621, 625, 637.1; 235/449

(56) References Cited

U.S. PATENT DOCUMENTS

| | | |
|---|---|---|
| 4,027,142 A | 5/1977 | Paup et al. |
| 4,786,789 A | 11/1988 | Gaucher |
| 5,049,898 A | 9/1991 | Arthur et al. |
| 5,646,388 A | 7/1997 | D'Entremont et al. |
| 5,757,431 A | 5/1998 | Bradley et al. |
| 5,771,071 A | 6/1998 | Bradley et al. |
| 5,789,727 A | 8/1998 | Teradaira et al. |
| 5,825,393 A | 10/1998 | Kocznar et al. |
| 5,886,334 A | 3/1999 | D'Entremont et al. |
| 5,965,862 A | 10/1999 | Momose |
| 6,017,161 A | 1/2000 | Harris et al. |
| 6,068,187 A | 5/2000 | Momose |
| 6,118,469 A | 9/2000 | Hosomi |
| 6,182,896 B1 | 2/2001 | Momose |

(List continued on next page.)

FOREIGN PATENT DOCUMENTS

| | | |
|---|---|---|
| EP | 0 115 189 A1 | 8/1984 |
| EP | 0 441 964 A1 | 8/1991 |
| EP | 0 492 900 A2 | 7/1992 |
| EP | 0 677 392 A1 | 10/1995 |
| EP | 0 895 868 | 2/1999 |

(List continued on next page.)

*Primary Examiner*—Stephen D. Meier
*Assistant Examiner*—Charles W. Stewart, Jr.
(74) *Attorney, Agent, or Firm*—Mark P. Watson

(57) ABSTRACT

Performing check processing operations from MICR processing to scanning the printed check as a continuous sequence of operations lightens the burden on the operator and shortens the required processing time. The compound processing system 10 has a transportation path 15 for conveying a check P, an MICR head 17 positioned along the transportation path 15 for reading MICR text prerecorded on the check P, front print head 23 positioned along the transportation path 15 for printing on the front of check P, back print head 21 positioned along the transportation path 15 for printing on the back of check P, and a scanner head 25 positioned along the transportation path 15 for scanning the printed side (either back or front) of the check P.

8 Claims, 16 Drawing Sheets

U.S. PATENT DOCUMENTS

| | | |
|---|---|---|
| 6,257,783 B1 | 7/2001 | Hanaoka et al. |
| 6,290,129 B2 | 9/2001 | Momose |
| 6,350,005 B1 | 2/2002 | Asai et al. |

FOREIGN PATENT DOCUMENTS

| | | |
|---|---|---|
| EP | 1 041 806 | 10/2000 |
| EP | 1 080 927 | 3/2001 |
| JP | 60-167460 | 11/1985 |
| JP | 63-135271 | 6/1988 |
| JP | 3-36054 | 2/1991 |
| JP | 3-224760 | 10/1991 |
| JP | 3-297670 | 12/1991 |
| JP | 04-205488 | 7/1992 |
| JP | 05-058514 | 3/1993 |
| JP | 05-105298 | 4/1993 |
| JP | 07-242044 | 9/1995 |
| JP | 07-276720 | 10/1995 |
| JP | 8-235309 | 9/1996 |
| JP | 9-504891 | 5/1997 |
| JP | 09-234924 | 9/1997 |
| JP | 10-83438 | 3/1998 |
| JP | 10-200673 | 7/1998 |
| JP | 10-509538 | 9/1998 |
| JP | 11-7497 | 1/1999 |
| JP | 11-027443 | 1/1999 |
| JP | 11-075030 | 3/1999 |
| JP | 11-129551 | 5/1999 |
| JP | 11-164086 | 6/1999 |
| JP | 2000-015886 | 1/2000 |
| JP | 2000-052603 | 2/2000 |
| JP | 2000-255828 | 9/2000 |
| JP | 2000-344428 | 12/2000 |
| JP | 2001-134702 | 5/2001 |
| JP | 2001-268315 | 9/2001 |
| WO | 95/11493 | 4/1995 |
| WO | 95/35217 | 12/1995 |
| WO | 96/10798 | 4/1996 |

MULTIFUNCTION DEVICE AND CONTROL METHOD FOR THE SAME

CONTINUING APPLICATION DATA

This application is a continuation-in-part of U.S. application Ser. No. 09/987,435 filed Nov. 14, 2001, which is a continuation-in-part of application Ser. No. 09/130,165, filed Aug. 6, 1998, issued as U.S. Pat. No. 6,350,005, the contents of which are incorporated herein by reference.

BACKGROUND OF THE INVENTION

1. Field of the Invention

The present invention relates to a multifunction device such as a check processing system that performs multiple processes such as magnetic ink character recognition (MICR) processing, printing information on the check, and scanning the printed side of the check, and to a control method for the multifunction device.

2. Description of the Related Art

Checks are commonly used to pay for retail purchases and to settle business transactions. The checking account number and bank routing information is printed on the face of the check using magnetic ink, and can be used to determine whether or not the check is valid.

After the validity of a check received at the checkout counter in a retail store is confirmed, the verification number and other endorsement information is printed on the back of the check (referred to as endorsement printing below). The payee and amount information are typically handwritten by the payer (account owner) on the front of the check, but checkout terminals equipped with printers capable of printing this information are becoming increasingly common.

After a check is processed at the store it is typically delivered to the bank or other financial institution on which it was drawn for final settlement. The settlement process can, however, be made more efficient by electronically sending the transaction content and an image of the printed check captured with a scanner directly to the financial institution, instead of sending the physical check.

If scanning the check and transmitting the transaction content and scanned image are done using one or more devices separate from that used for such conventional processes as MICR reading and printing the check, operation becomes unnecessarily complicated for the operator, more time is needed to process each check, and additional space must be found to install the separate devices.

OBJECTS OF THE INVENTION

An object of the present invention is therefore to provide a multifunction device and control method that can lighten the burden on the operator and shorten check processing time by performing as a single continuous check processing operation steps from capturing the MICR data to scanning the printed check.

SUMMARY OF THE INVENTION

A multifunction device according to the present invention achieving these and other objects has a transportation path for guiding a print medium, a magnetic head positioned along the transportation path for reading magnetic ink characters prerecorded on the print medium, a first print head positioned along the transportation path for printing on a first side of the print medium, a second print head positioned along the transportation path for printing on a second side of the print medium, and a scanner head positioned along the transportation path for scanning either the first or second side of the print medium.

This multifunction device preferably also has an insertion opening formed at one end of the transportation path for inserting the print medium, and an exit opening formed at the other end of the transportation path for ejecting the print medium. The magnetic head in this case is positioned on the insertion opening side of the first and second print heads, and the scanner head is positioned on the exit opening side of the first and second print heads. When thus comprised, the magnetic ink character reading process can be run while the print medium inserted from the insertion open is transported into the multifunction device, and the print medium can be scanned with the scanner head while ejecting the print medium from the multifunction device. A short transportation path can therefore be used, reducing the size of the multifunction device and shortening the processing time.

Further preferably, the insertion opening is horizontally oriented so that the print medium can be inserted substantially horizontally, and the exit opening is vertically oriented so that the print medium can be ejected substantially vertically. Compared with a configuration having a straight transportation path, this configuration enables the size of the multifunction device to be reduced, and the print medium can be held in the vertical end of the transportation path after processing the print medium is finished.

Yet further preferably, the multifunction device also has a pressure feed roller positioned opposite the scanner head for transporting while pressing the print medium against the scanner head, and a roller retraction mechanism for retracting the pressure feed roller from the scanner head to open the transportation path. By thus retracting the pressure feed roller from the transportation path when not scanning, catching the print medium by the pressure feed roller is avoided, and paper jams and skips in the feed pitch can be prevented.

Yet further preferably, the multifunction device also has a first process control unit for scanning and then ejecting the print medium, a second process control unit for ejecting the print medium without scanning, and a process selection unit for selecting either the first or second process control unit. This configuration enables the print medium to be selectively scanned in accordance with the type of print media and customer desires while being able to continuously run a series of multiple processes including scanning.

A multifunction device control method according to the present invention achieving the above objects is a method for controlling a multifunction device as described above by reading the magnetic ink characters with the magnetic head while transporting the print medium inserted from the insertion opening toward the exit opening, transporting the print medium to a first print head printing starting position after reading the magnetic ink characters, printing on the first side of the print medium using the first print head while transporting the print medium in a direction along the transportation path, transporting the print medium to a second print head printing start position after finishing printing with the first print head, printing on the second side of the print medium using the second print head while transporting the print medium in a direction along the transportation path, transporting the print medium to a scanning start position, for scanning by the scanner head after finishing printing with the second print head, and scanning either the first or second side of the print medium with the scanner head while transporting the print medium toward the exit opening.

The print medium is preferably transported toward the insertion opening in this control method in the step of printing with the first print head or in the step of printing with the second print head. This enables a series of processes to be run while transporting the print medium bi-directionally in the transportation path, thereby enabling the transportation path to be shortened and the size of the multifunction device to be reduced.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
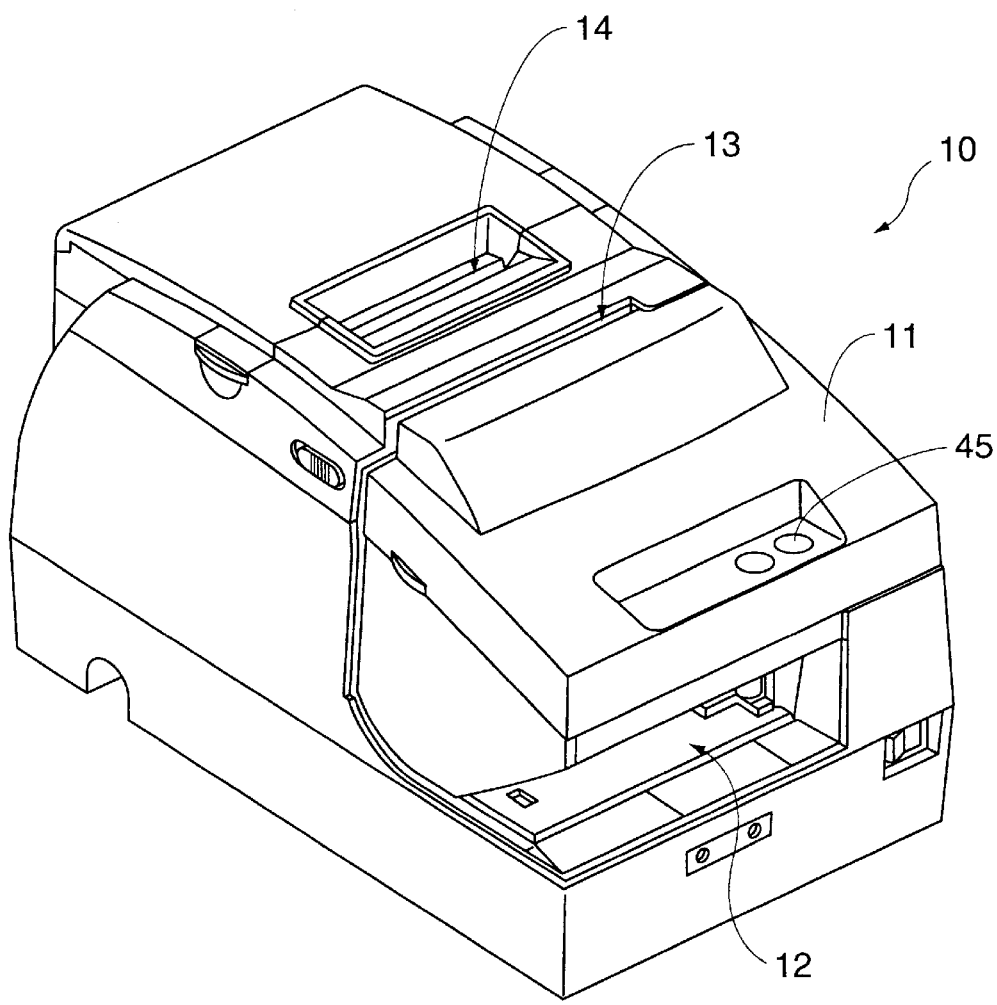
FIG. 1 is a perspective view of a multifunction device according to a preferred embodiment of the invention.

Preferred embodiments of the present invention are described below with reference to the accompanying figures. FIG. 1 is a perspective view of a multifunction device according to a preferred embodiment of the invention.

As shown in FIG. 1 this multifunction device 10 is covered by a plastic cover 11 having an insertion opening 12 formed at the front for manually inserting a check P (FIG. 3) or other sheet, and an exit opening 13 formed on top for ejecting the check P. This multifunction device 10 also has a roll paper housing (not shown in the figure) at the back for storing roll paper. Paper is transported through the printing unit from the roll in the roll paper housing, and is pulled out from a roll paper exit 14 formed on top of the multifunction device 10.

Figure 2:
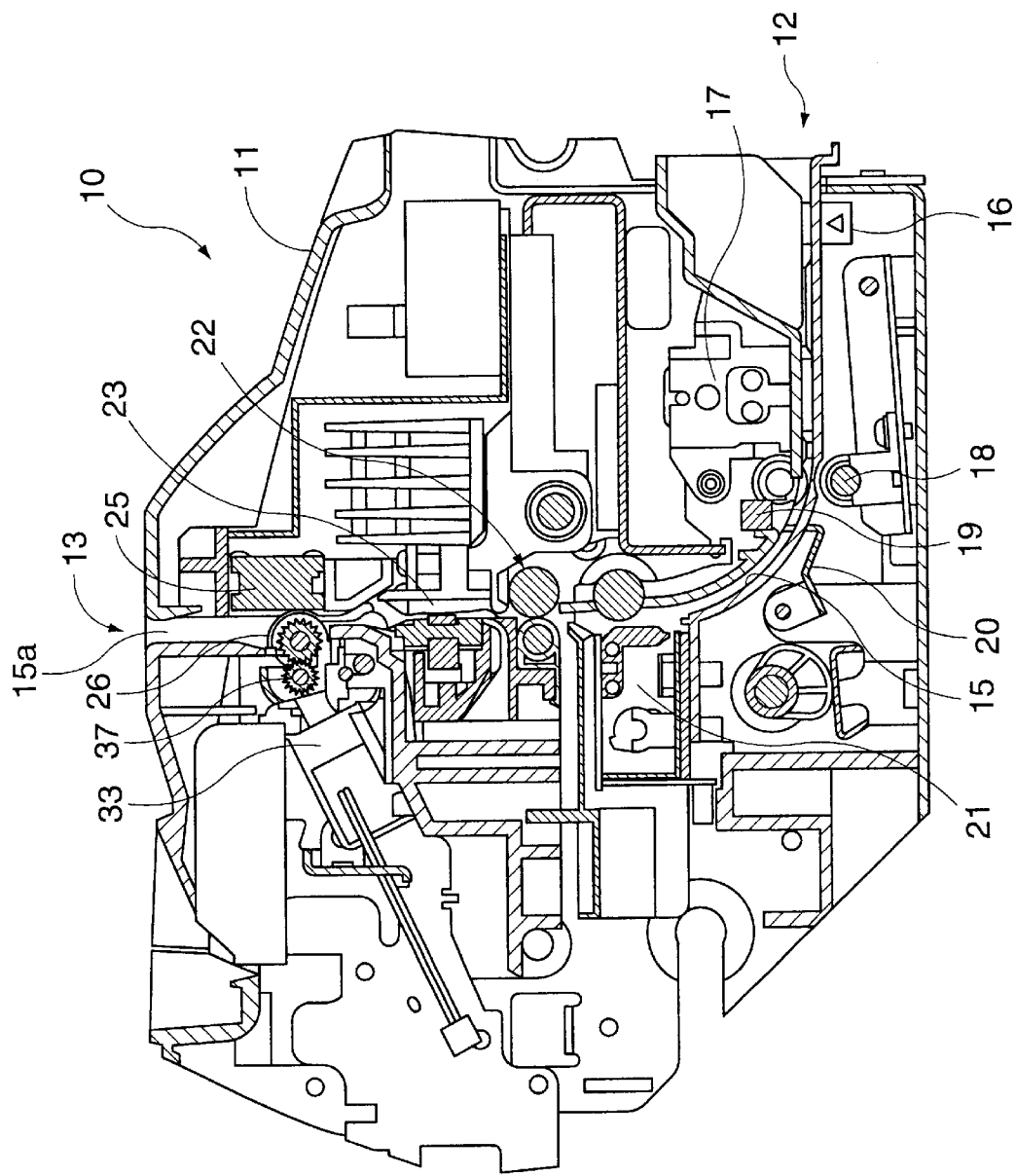
FIG. 2 is a side section view showing the internal structure of the multifunction device.

FIG. 2 is a side section view showing the internal structure of the multifunction device. As shown in FIG. 2 a check P transportation path 15, formed inside the multifunction device 10, extends from insertion opening 12 to exit opening 13. The transportation path 15 bends in an L-shape as seen in a side view from the horizontally oriented insertion opening 12 to the vertically oriented exit opening 13. Positioned along the transportation path 15 in order from the insertion opening 12 side are form trailing edge detector 16, MICR head (magnetic head) 17, first feed roller pair 18, form leading edge detector 19, form positioning member 20, back print head (second print head) 21, second feed roller pair 22, front print head (first print head) 23, form ejection detector 24 (FIG. 10), and scanner head 25. Opposite the scanner head 25 are scanner feed rollers (pressure feed rollers) 26.

The trailing edge detector 16, leading edge detector 19, and form ejection detector 24 are, for example, light transmitting or reflecting type photodetectors enabling non-contact detection of the check P at respective points along the transportation path 15. The form positioning member 20 stops a check P inserted from the insertion opening 12 at a specific position, and can be moved using a solenoid or other actuator type drive source so that the form positioning member 20 projects into and blocks the transportation path 15, or is retracted from and opens the transportation path 15.

The first feed roller pair 18 and second feed roller pair 22 each have a pair of rollers positioned on opposing sides of the transportation path 15 such that the rollers can be appropriately driven to transport the check P in forward or reverse direction. One roller in each pair can also be freely moved to or away from the opposing roller by driving a solenoid or other actuator to open and close the transportation path 15 by advancing or retracting the rollers.

Figure 3:
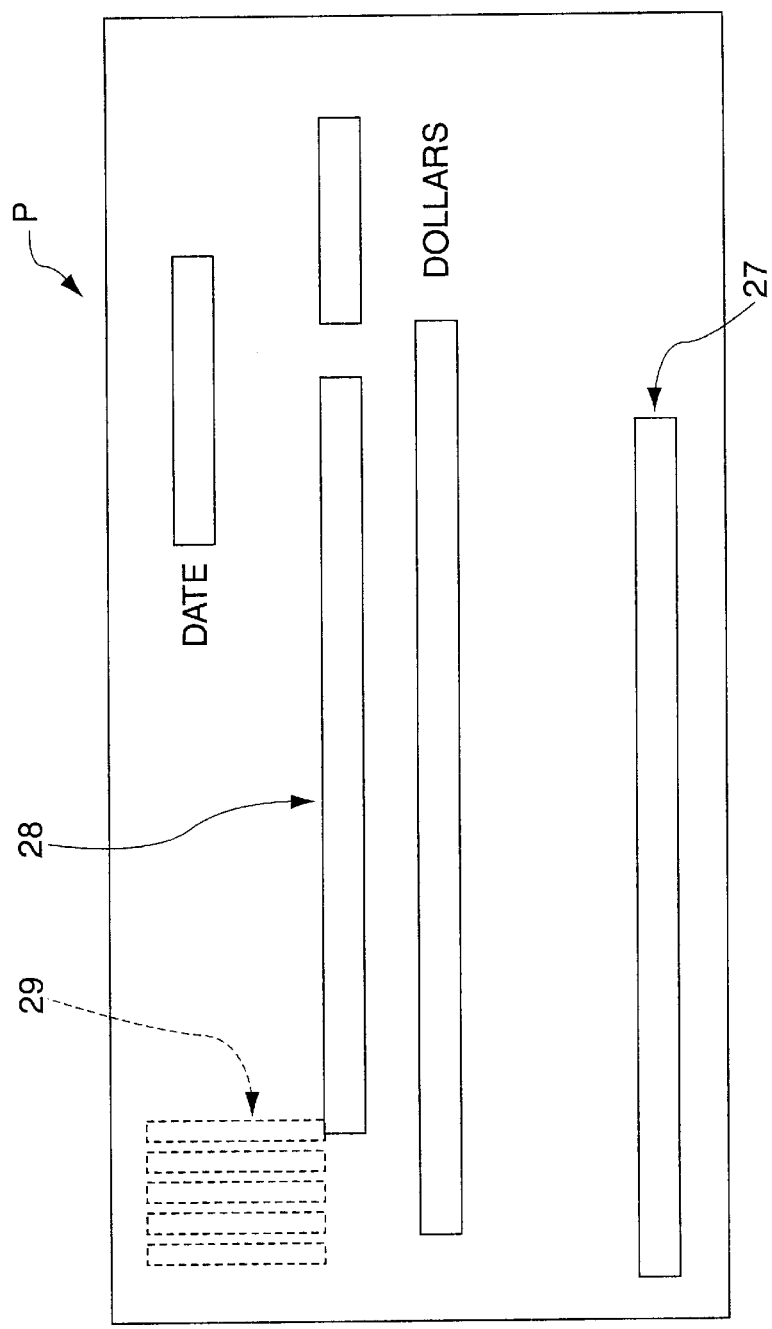
FIG. 3 is a schematic view of a typical check.

The MICR head 17 reads magnetic ink characters printed on the front of the check P, and validity of the check P is determined based on the data read by the MICR head 17. MICR text is recorded in a specific MICR recording area 27 on the front of the check P as shown in FIG. 3, and includes such information as the account number against which the check P is drawn. Opposite the MICR head 17 is a pressure member 17a (FIG. 14) for pressing a check P against the MICR head 17 during MICR reading. This pressure member 17a is normally retracted from the MICR head 17 so that the transportation path 15 is open.

The front print head 23 is used to print information on the front of the check P, such as the payee, date, check amount, and other information generally included on the face of the check (hereinafter "check face information"). This check face information is printed on a front printing area 28 as shown in FIG. 3. The front print head 23 is preferably a serial print head supported on a carriage for printing a dot matrix of one or more rows as the front print head 23 moves widthwise across the front of the check. This embodiment of the invention uses a dot impact type print head for transferring ink from an ink ribbon to the check P as the front print head 23, but it will be evident that other types of print heads could be alternatively used.

The back print head 21 is used to print a customer verification number, date, check amount, and other information needed by the store on the back of the check P. This information is printed on the back in an endorsement printing area 29 such as shown in FIG. 3 in phantom. The back print head 21 is preferably a shuttle print head with plural heads arrayed widthwise to the check P with a specific gap therebetween, and prints a dot matrix of one or more rows by moving the print head within this specific width. It will be further noted that while this embodiment uses a dot impact print head to transfer ink from an ink ribbon to the check P as the back print head 21, other types of print heads could be used.

Figure 4:
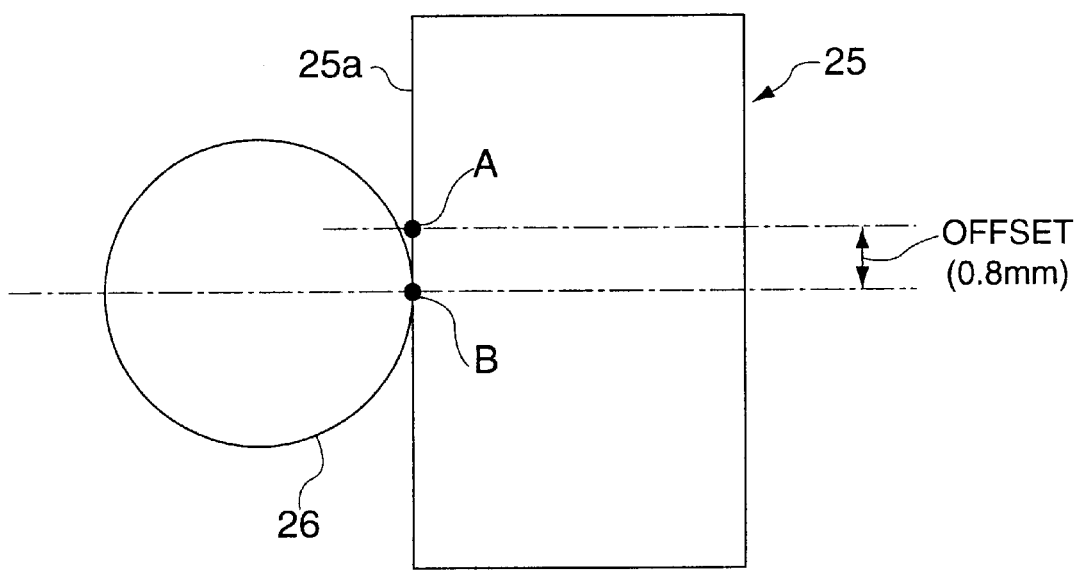
FIG. 4 is a side view of the scanner head and scanner feed rollers.

The scanner head 25 is for scanning the surface of the printed check P. The scanned image data is then compressed and sent to and stored in a host computer, and used to electronically settle transactions. This embodiment of the invention uses a contact image sensor (CIS) for the scanner head 25 to scan checks P placed against the scanning glass 25a (FIG. 4).

The scanner feed roller 26 transports the check P for scanning, pressing the check P against the scanning glass 25a of scanner head 25 while transporting the check P to the exit opening 13 side. As shown in FIG. 4, this scanner feed roller 26 presses the check P against the scanning glass 25a at a position offset slightly from the scanner focusing position A rather than directly at the scanner focusing position A. More specifically, scanner focusing position A is offset either upstream or downstream along the transportation path relative to the scanner contact position B of the scanner feed roller 26. In this embodiment scanner focusing position A is offset 0.8 mm to the downstream side (the exit opening 13 side) from scanner contact position B of scanner feed roller 26. Applying pressure from the scanner feed roller 26 directly to the scanner glass at the focusing position A is thus avoided.

It is therefore possible to reduce the likelihood of transferring ink onto the glass at scanner focusing position A when scanning a check P immediately after printing. This prevents a reduction in scanned image quality that can occur when ink adheres to the glass at the focusing position.

Furthermore, the largest possible scanable area can be assured at the leading edge of the check P because the scanner focusing position A is offset to the downstream side from the scanner contact position B of scanner feed roller 26. It should be noted that if the scanner focusing position A is greatly offset from the scanner contact position B of scanner feed roller 26, the check P could drift away from the scanning glass 25a at scanner focusing position A. The offset in the present embodiment is only 0.8 mm, however. Separation of the check P from the scanning glass 25a is therefore held to 0.2 mm or less, and there is no danger of a drop in scanned image quality.

During scanner operation the scanner feed roller 26 conveys the check P upward so that the check P is ejected from exit opening 13. The trailing edge of the ejected check P is held at this time in the transportation path 15 on the downstream side of the scanner feed roller 26. More specifically, the exit end of the transportation path 15 (the part between scanner feed roller 26 and exit opening 13) is vertically oriented with a length of approximately L/6 (where L is the length of check P) so that the ejected check P can be held and will not fall out of the multifunction device 10.

Figure 5:
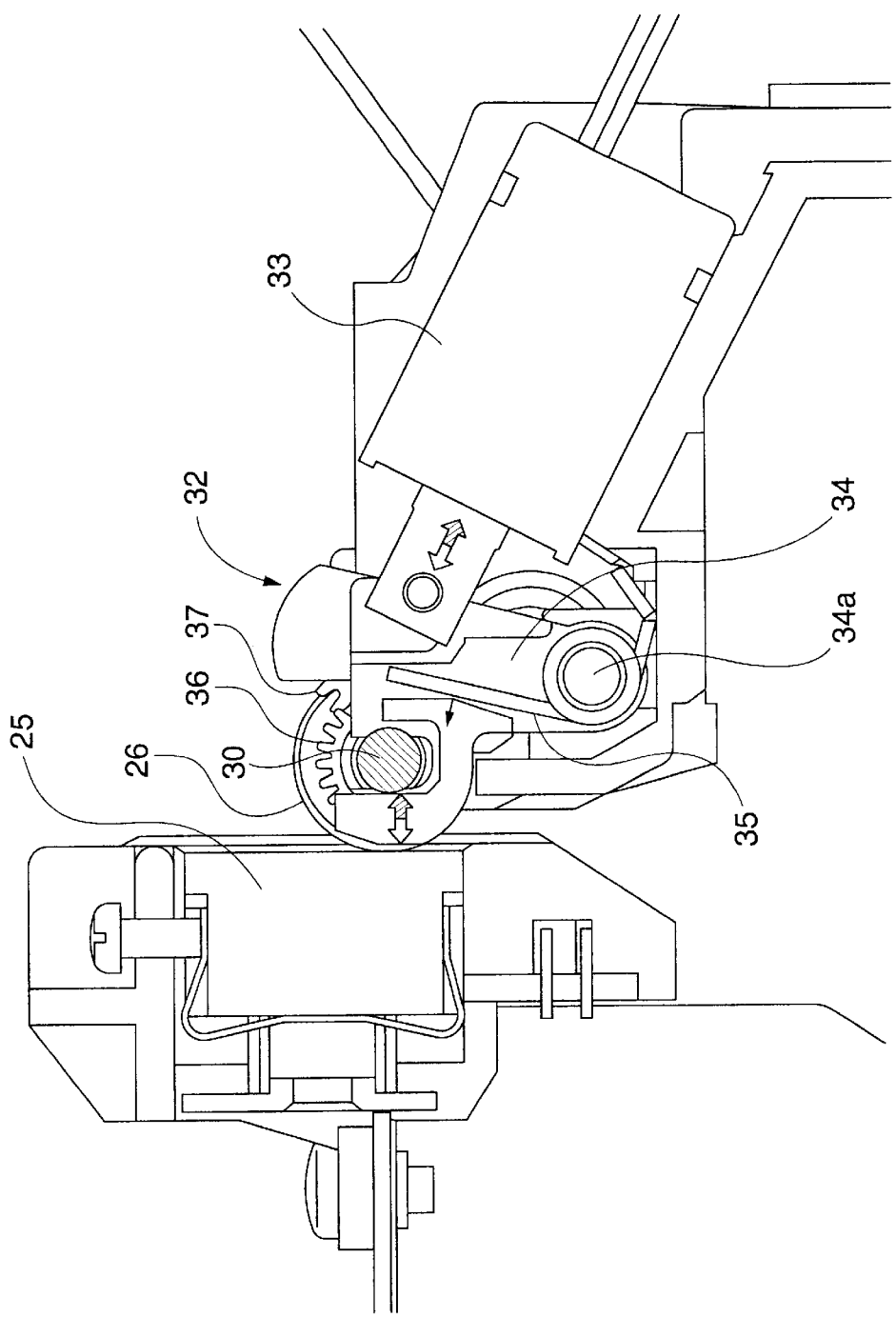
FIG. 5 is a side view of the roller retraction mechanism.
Figure 6:
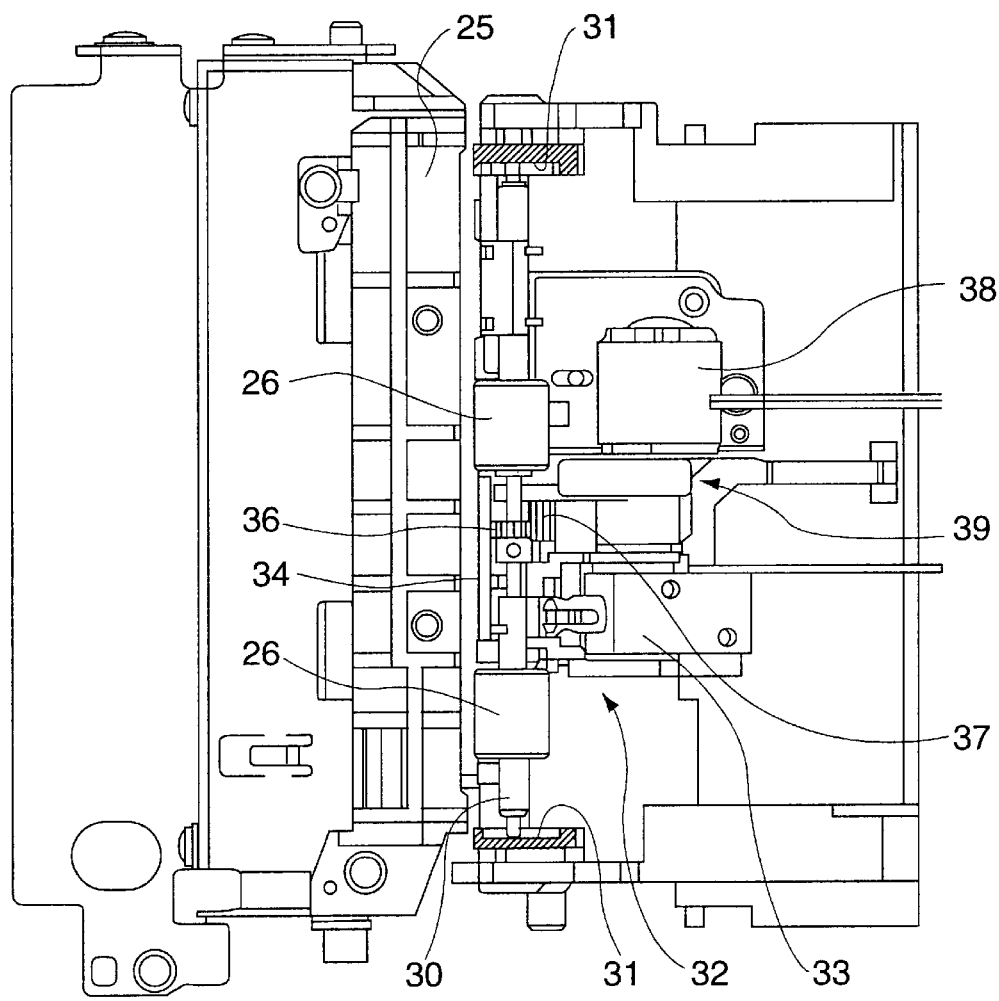
FIG. 6 is a plan view of the roller retraction mechanism.

FIG. 5 is a side view of the roller retraction mechanism and FIG. 6 is a plan view of the roller retraction mechanism. As shown in these figures a pair of scanner feed rollers 26 is positioned with a specific gap therebetween on a roller support shaft 30. The roller support shaft 30 is supported in the middle by a roller retraction mechanism 32 and the ends of the roller support shaft 30 are guided in a guide channel 31 so as to move freely forward and back toward and away from the scanner head 25. The roller retraction mechanism 32 is configured to pull the roller support shaft 30 back when driven by the scanner feed roller solenoid 33, thereby retracting the scanner feed rollers 26 from the scanner head 25 and opening the transportation path 15. In other words, when not scanning, the scanner feed rollers 26 are in the retracted position so that the end of the check P does not get caught by the scanner feed rollers 26. Furthermore, after the check P is advanced to the scanning start position by the first feed roller pair 18 and second feed roller pair 22 for the scanning operation, the scanner feed rollers 26 are released from the retracted position to press the check P against the scanner head 25 and are then driven to advance the check P.

The roller retraction mechanism 32 has a pressure lever (rotating member) 34 rotatably supporting and advancing or retracting the roller support shaft 30 toward or away from the scanner head 25, a presser spring 35 for urging the pressure lever 34 toward the scanner head 25, and a scanner feed roller solenoid 33 for retracting the pressure lever 34 against the urging force of the presser spring 35.

The pressure lever 34 is a rotating member that can rotate freely forward and back about a rotating support shaft 34a, and by supporting the roller support shaft 30 of the scanner feed rollers 26 so that the shaft 30 and rollers 26 can be freely advanced and retracted, the roller retraction mechanism 32 can be compactly configured and the scanner feed rollers 26 can be smoothly advanced and retracted. The pressure lever 34 rotatably supports the roller support shaft 30 between the pair of right and left scanner feed rollers 26. Substantially uniform pressure can therefore be applied by a single presser spring 35 to the pair of scanner feed rollers 26, the pair of scanner feed rollers 26 be advanced and retracted substantially parallel to the scanner head 25, and the transportation path 15 can be reliably opened.

As shown in FIGS. 5 and 6, a drive system for driving the scanner feed rollers 26 is also positioned near the roller retraction mechanism 32. The scanner feed roller 26 drive system includes a first gear 36 integrally formed with the roller support shaft 30 between the pair of scanner feed rollers 26, a second gear 37 positioned near the pressure lever 34 and constantly meshed with the first gear 36, and a transfer mechanism 39 for transferring drive power from the scanner feed motor 38 to the second gear 37. A path for transferring roller drive power to the support part of the roller support shaft 30 is thus formed, power can be reliably transferred to the scanner feed rollers 26, and the scanner feed rollers 26 can be rotated without disrupting the pressure balance of the rollers by juxtaposing the position where pressure is applied to the roller support shaft 30 by the presser spring 35 and the position where power is transferred to the roller support shaft 30.

Figure 7:
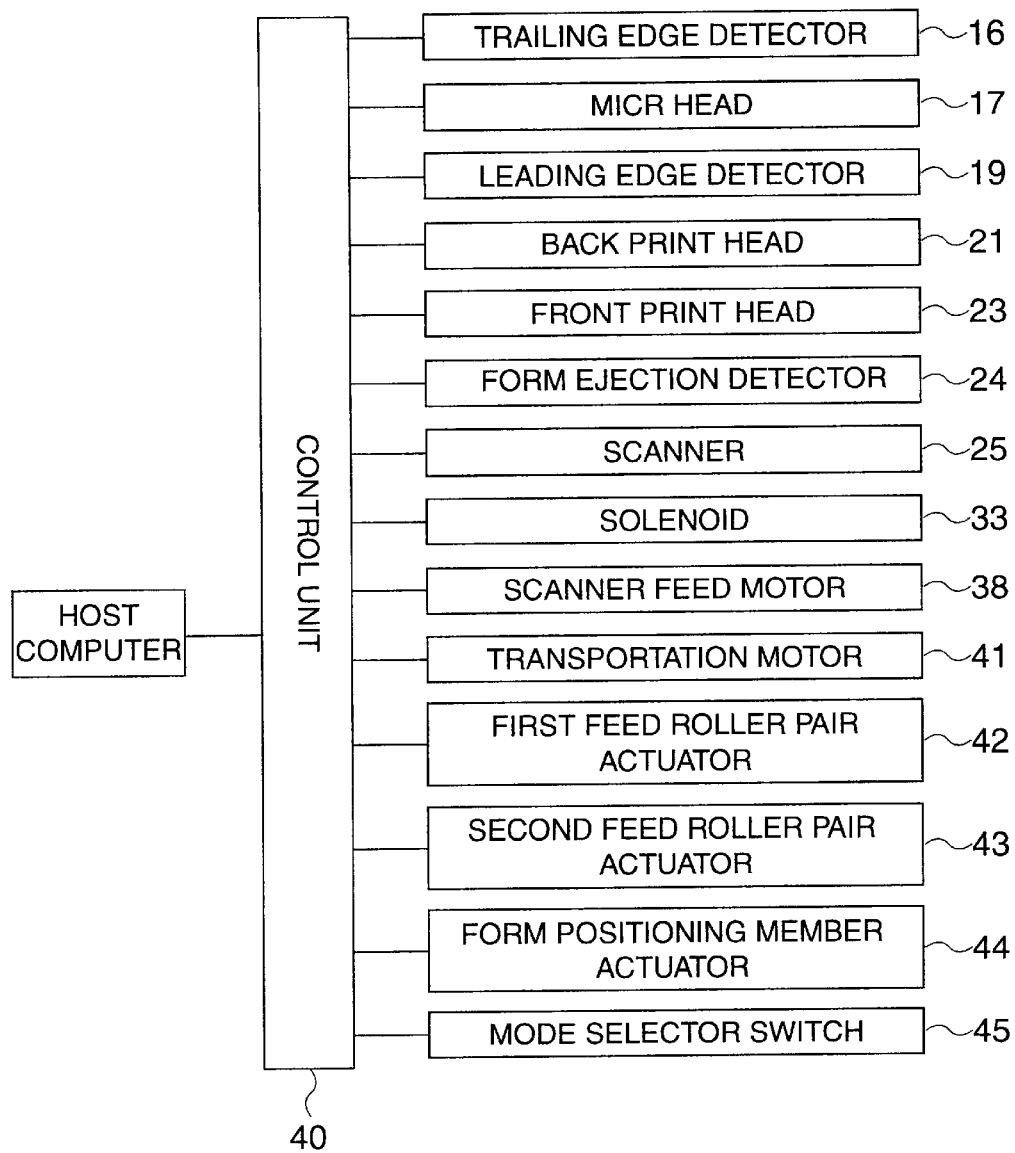
FIG. 7 is a block diagram showing control unit inputs and outputs.

FIG. 7 is a block diagram showing control unit inputs and outputs. As shown in FIG. 7 the multifunction device 10 has a control unit 40 comprising a CPU, ROM, RAM, and other devices. In addition to the above-described trailing edge detector 16, MICR head 17, leading edge detector 19, back print head 21, front print head 23, form ejection detector 24, scanner head 25, scanner feed roller solenoid 33, and scanner feed motor 38, transportation motor 41 for driving the first feed roller pair 18 and second feed roller pair 22, first feed roller pair actuator 42 for opening and closing the first feed roller pair 18, second feed roller pair actuator 43 for opening and closing the second feed roller pair 22, form positioning member actuator 44 for operating the form positioning member 20 to open and closed positions, and mode selector switch 45 for selecting a first process control mode (with scanning) or a second process control mode (without scanning), are also connected to the control unit 40.

The compound process control sequence run by the control unit 40 for the first process control mode and second process control mode is described next with reference to the accompanying flow charts. The control unit 40 operating in the first process control mode forms a first process control unit in the present invention, and the control unit 40 operating in the second process control mode forms a second process control unit in the present invention. Mode selector switch 45 forms a process selection unit in the present invention. The mode selector switch 45 may be a panel button switch (FIG. 1) that may be selected by the operator and/or a software switch that may be set according to the type of media being processed, i.e. automatically set to print and scan (first process mode) for checks and automatically set to print only (second process mode) for roll paper receipts.

Figure 8:
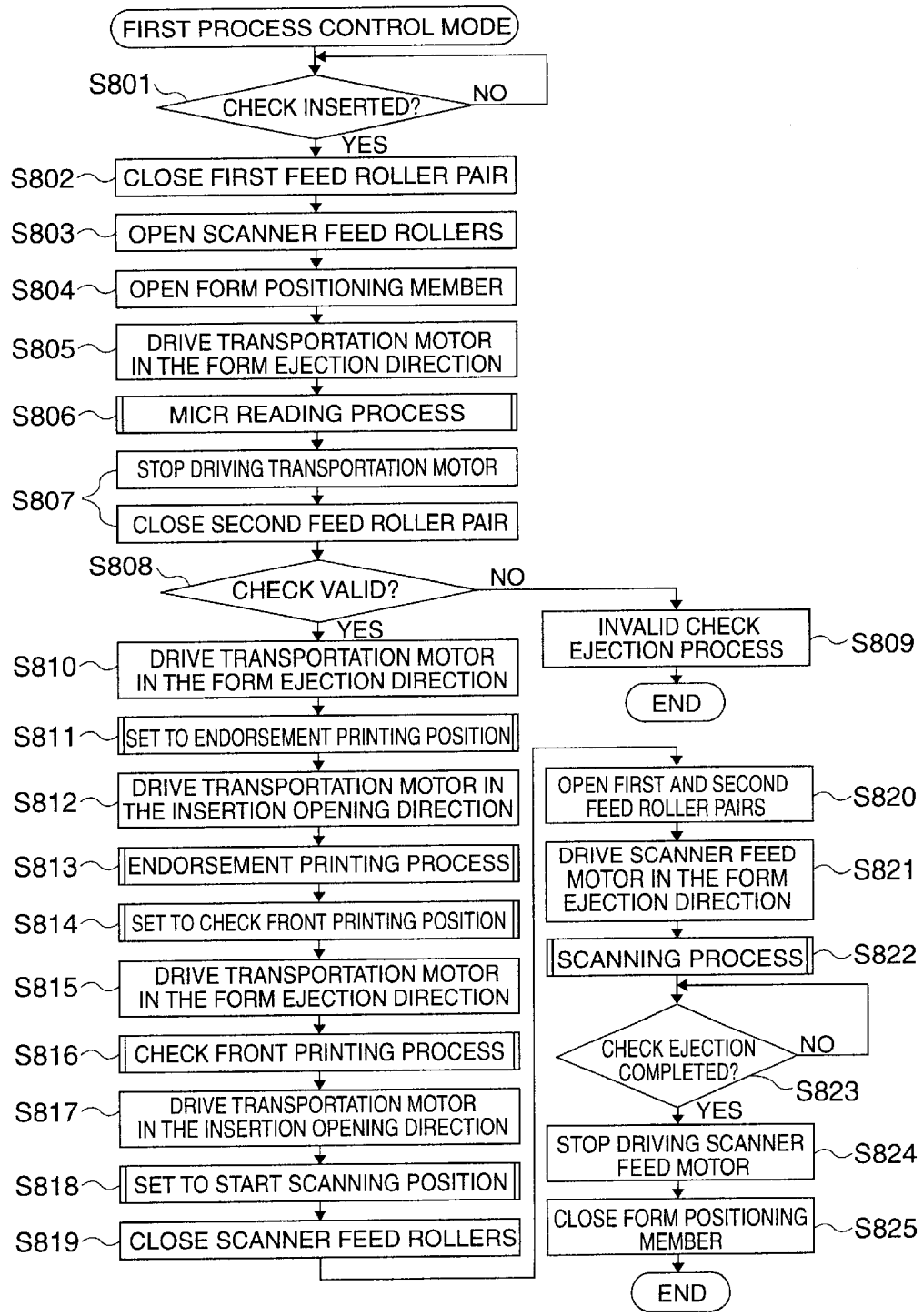
FIG. 8 is a flow chart of the first process control mode.
Figure 9:
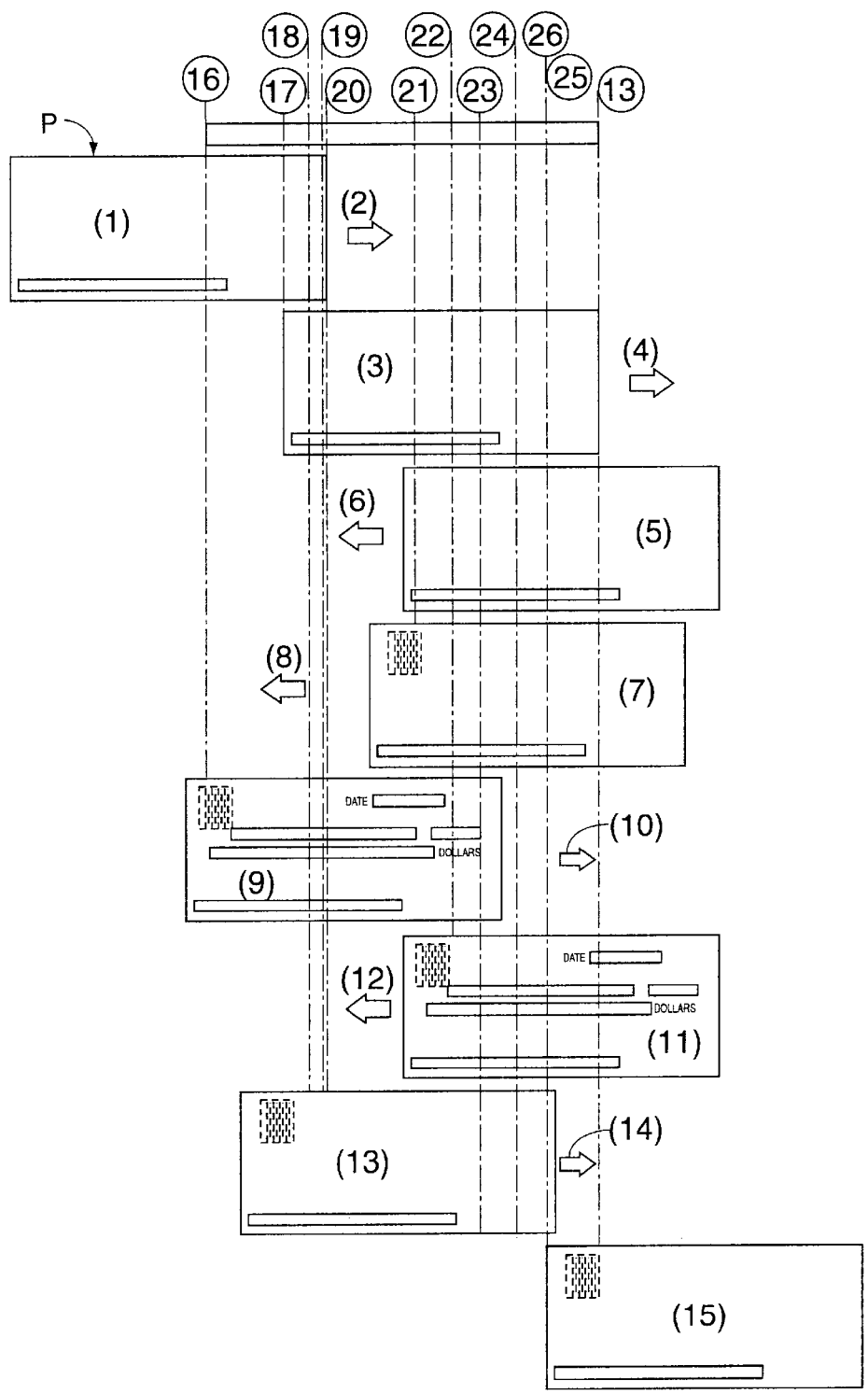
FIG. 9 illustrates operation in the first process control mode.
Figure 10:
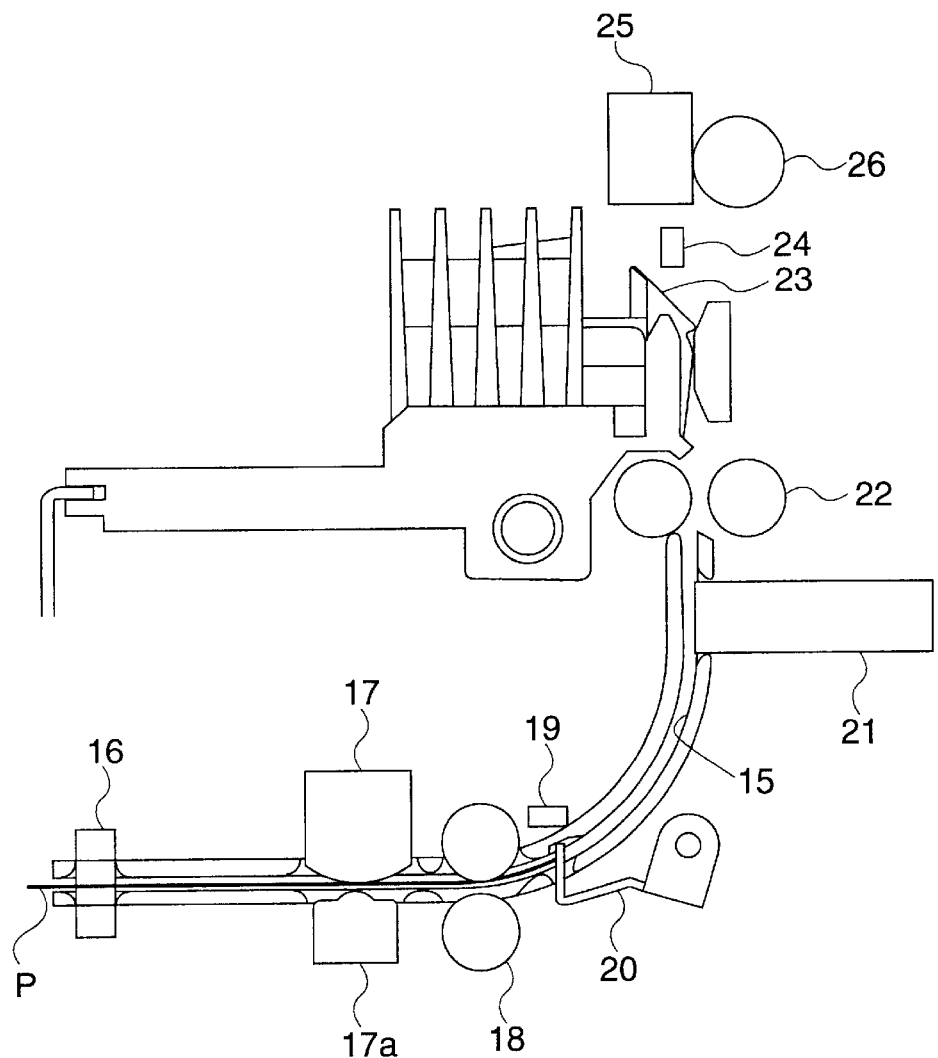
FIG. 10 is an internal side view of the multifunction device during check insertion.
Figure 11:
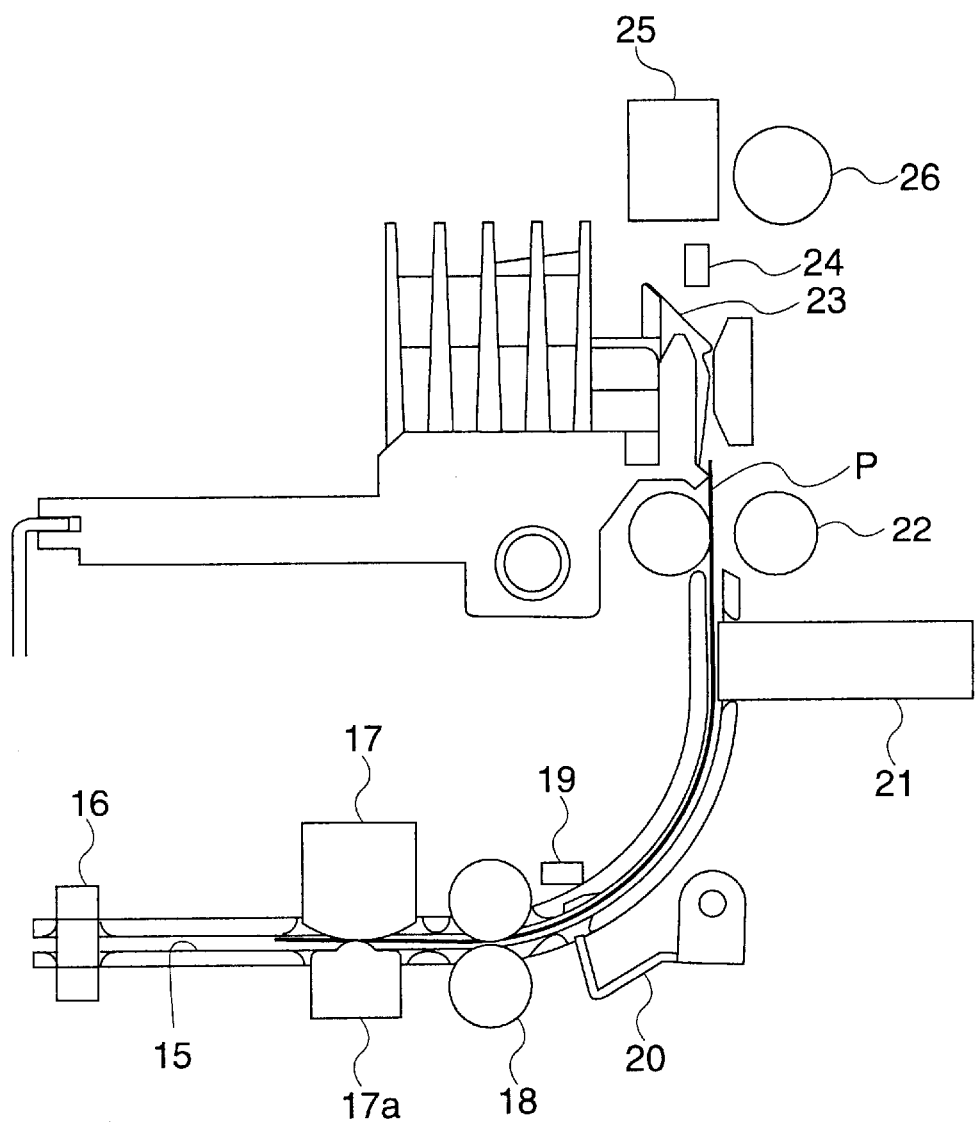
FIG. 11 is an internal side view of the multifunction device during MICR reading.
Figure 12:
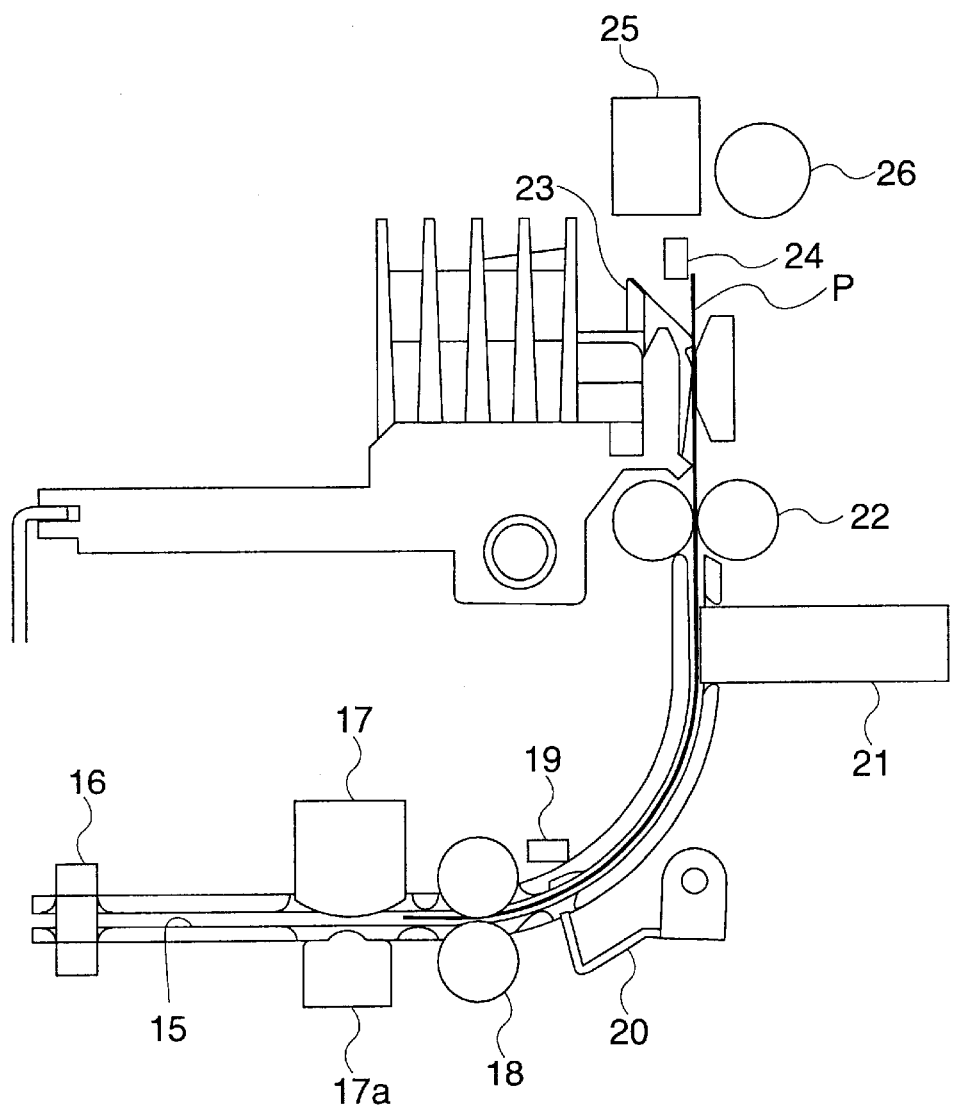
FIG. 12 is an internal side view of the multifunction device when printing.
Figure 13:
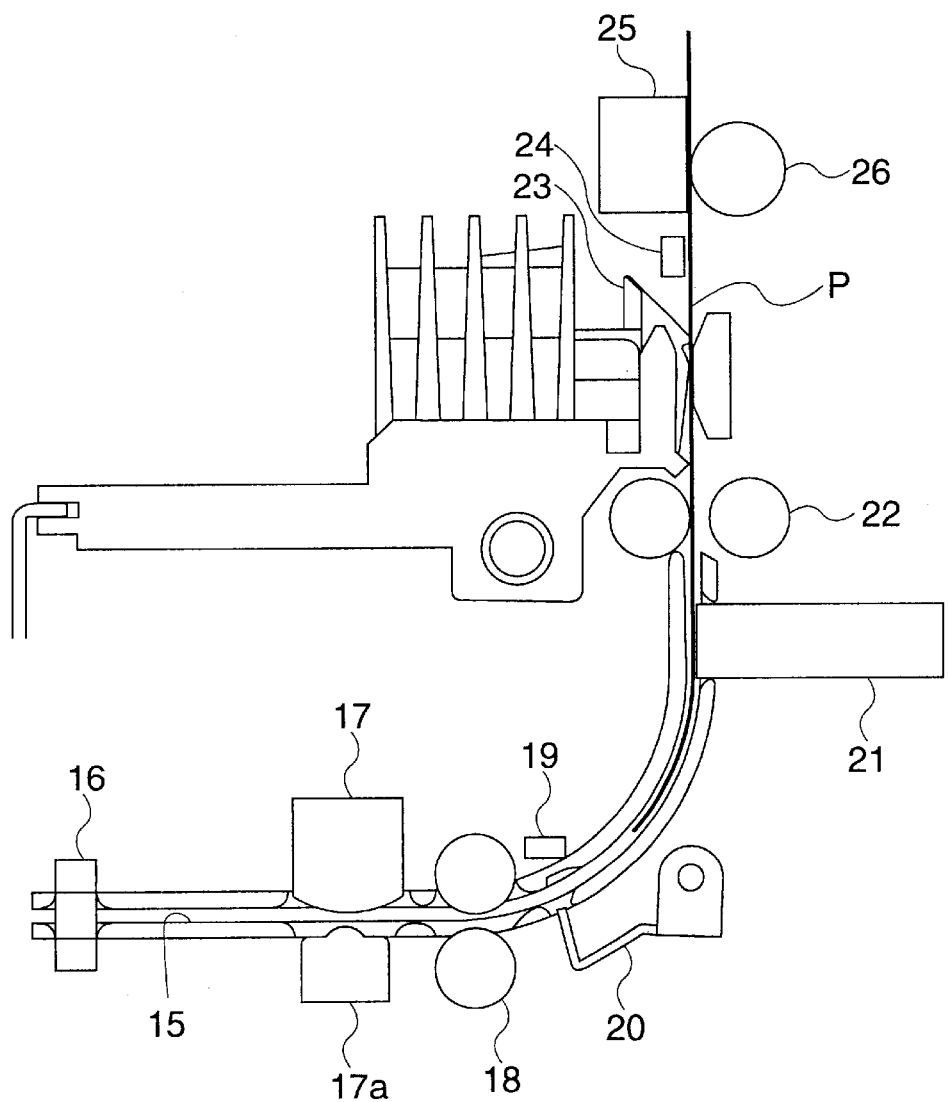
FIG. 13 is an internal side view of the multifunction device during scanning.

FIG. 8 is a flow chart of the first process control mode; FIG. 9 illustrates operation in the first process control mode; FIG. 10 is an internal side view of the multifunction device during check P insertion; FIG. 11 is an internal side view of the multifunction device during MICR reading; FIG. 12 is an internal side view of the multifunction device when printing; and FIG. 13 is an internal side view of the multifunction device during scanning.

As shown in the figures, the first step in the first process control mode is to wait for insertion of a check P (S801). During this time the first and second feed roller pairs 18, 22 are held open, and the form positioning member 20 and scanner feed rollers 26 are held closed. Note that if operation was previously in the second process control mode, the scanner feed rollers 26 are open.

When a check P is inserted from insertion opening 12, check P insertion is detected from the detection signals output by trailing edge detector 16 and leading edge detector 19 (FIG. 9 (1), FIG. 10). When check P insertion is detected, the first feed roller pair 18 closes (S802), the scanner feed rollers 26 open (S803), and the form positioning member 20 opens (S804). MICR text is then read with the MICR head 17 (S806, FIG. 9 (2), (3), FIG. 11) while driving the transportation motor 41 in the form ejection direction (S805). After MICR reading, driving the transportation motor 41 stops (S807) and the second feed roller pair 22 closes. The data read with the MICR head 17 is sent to a host computer for check P verification. When the verification result is received from the host computer the result is evaluated (S808). If the check P is invalid, an invalid check ejection process (S809) is run and the first process control mode ends.

If the check P is valid, the transportation motor 41 is driven in the form ejection direction (S810) to set the check for endorsement printing on the check back, (S811, FIG. 9 (4), (5), FIG. 12). The check is set to the endorsement printing position and to other various positions noted below by driving the transportation motor 41 a specified number of steps referenced to positions detected by the detectors 16, 19, and 24 (including stopping form transport). When positioning for endorsement printing is completed the transportation motor 41 is driven in the insertion opening 12 direction (S812) while running the endorsement printing process with the back print head 21 (S813, FIG. 9 (6), (7)).

When the endorsement printing process is completed, the check P is set to the front printing position (S814, FIG. 9 (8), (9)), and then, while driving the transportation motor 41 in the form ejection direction (S815), the front of the check is printed using the front print head 23 (S816, FIG. 9 (10), (11)). When printing the check front is completed the transportation motor 41 is again driven in the insertion opening 12 direction (S817) to set the check P to the start scanning position (S818, FIG. 9 (12), (13)), the scanner feed rollers 26 are closed (S819), and the first and second feed roller pairs 18, 22 are opened (S820). The scanning process (S822, FIG. 9 (14), FIG. 13) is then run while driving the scanner feed motor 38 in the form ejection direction (S821).

A check ejection decision (S823) is then made after the scanning process ends. If the decision is to eject the check P (FIG. 9 (15)), driving the scanner feed motor 38 stops (S824), the form positioning member 20 is set to the closed position (S825), and the first process control mode ends.

The ejected check P is prevented from dropping into the transportation path 15 on the upstream side by the scanner feed rollers 26 and is held within the vertically oriented section of the transportation path 15 on the downstream side so that it will not fall out from the multifunction device 10.

It should be noted that by controlling the transportation motor 41 synchronized to the scanner feed speed in the first process control mode, the check P can be transported to the end of the scanning process with the first and second feed roller pairs 18, 22 closed.

Figure 14:
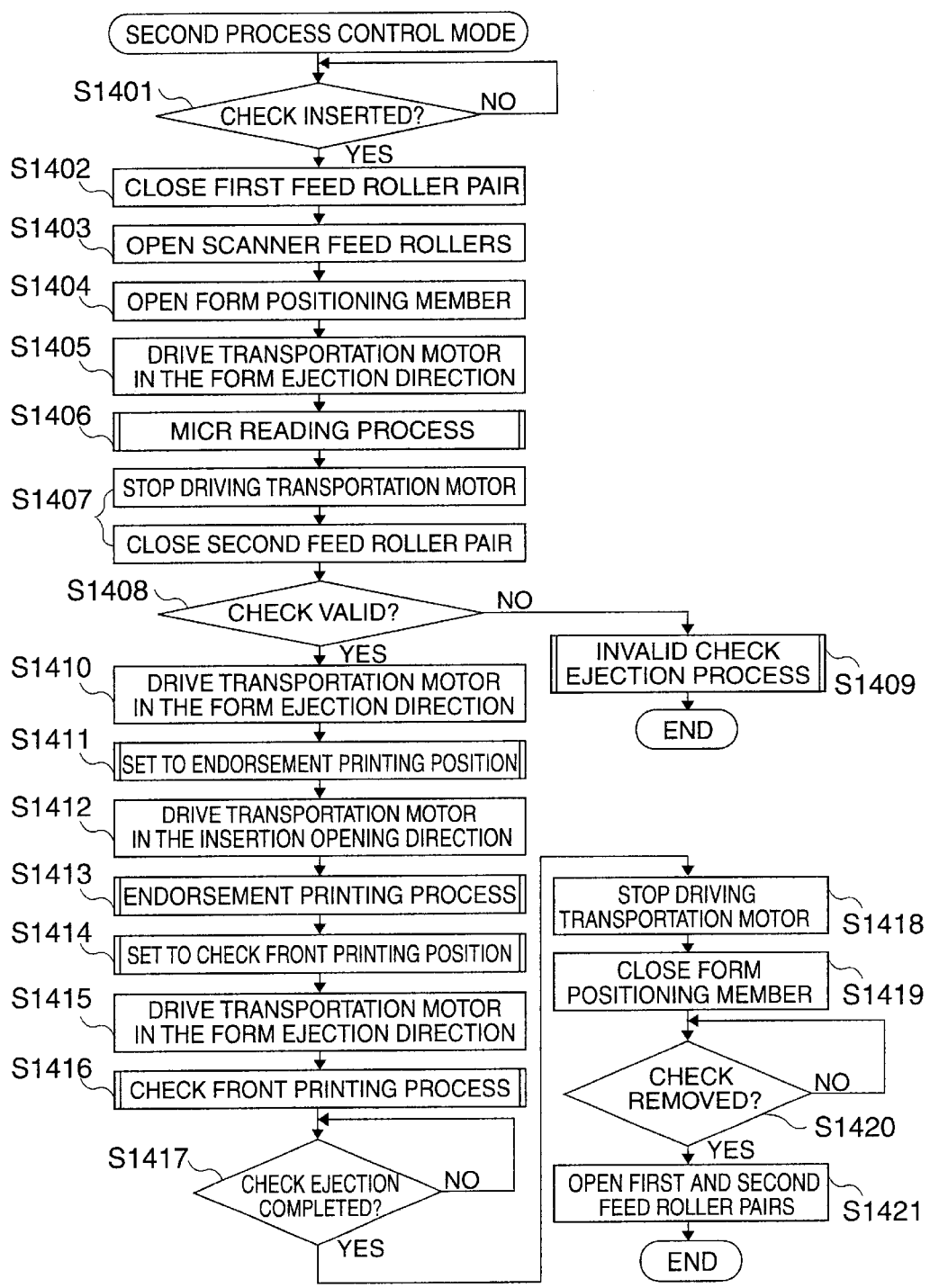
FIG. 14 is a flow chart showing the second process control mode.
Figure 15:
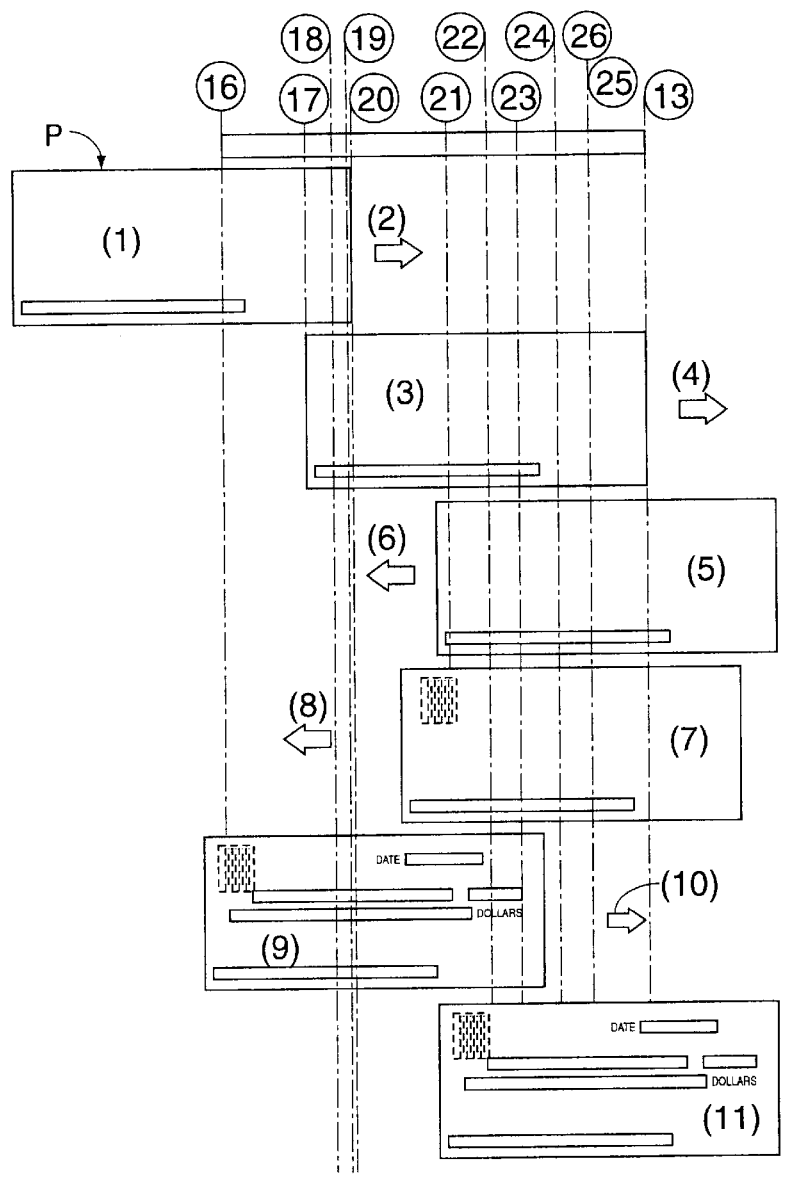
FIG. 15 illustrates operation in the second process control mode.
Figure 16:
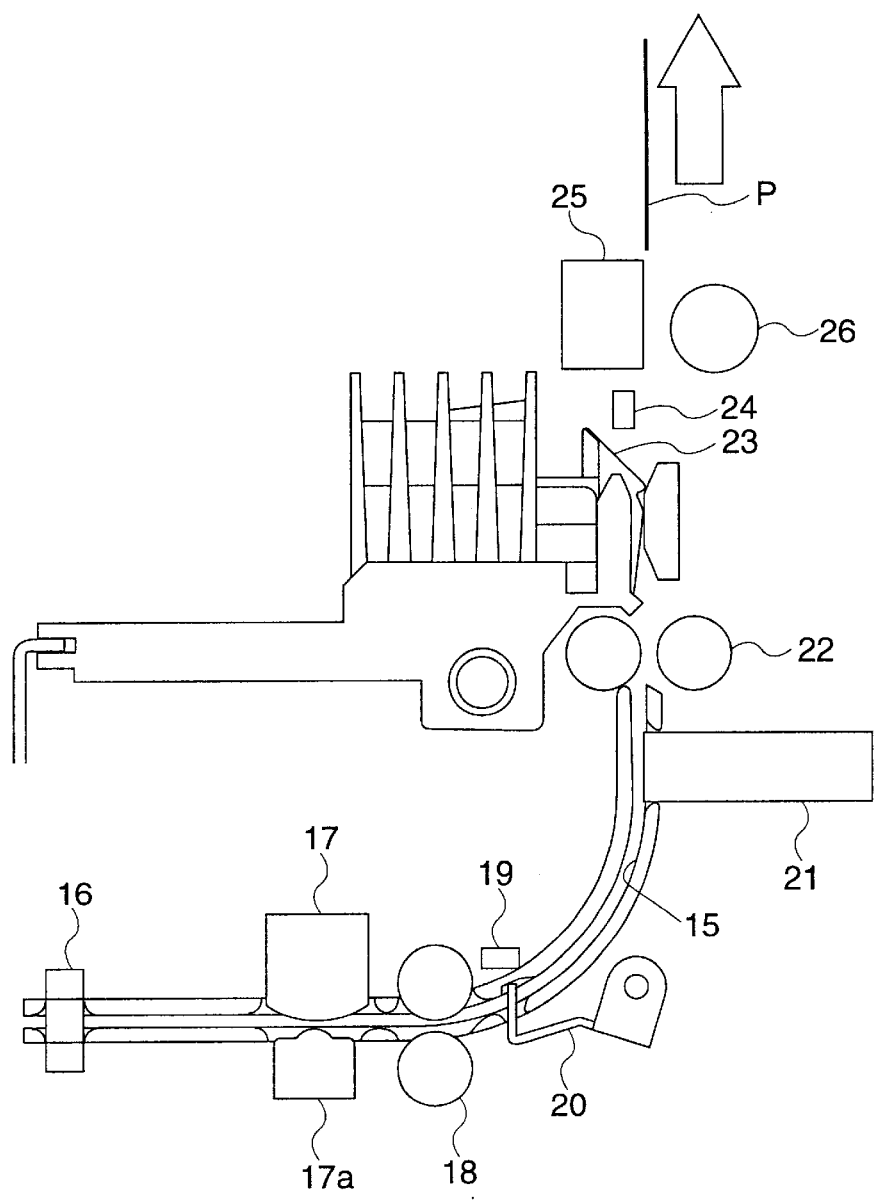
FIG. 16 is an internal side view of the multifunction device showing removal of an ejected check.

FIG. 14 is a flow chart of the second process control mode (without scanning); FIG. 15 illustrates operation in the second process control mode; and FIG. 16 is an internal side view of the multifunction device when removing an ejected check. As can be seen from the figures, steps S1401 to S1416 in this second process control mode are the same as steps S801 to S816 in the first process control mode. These steps will be understood from the preceding description of the first process control mode in conjunction with FIG. 10 to FIG. 12.

After the check front printing process ends in the second process control mode it is decided whether to continue driving the form in the form ejection direction and complete ejection of the check P (S1417). If the form ejection is completed, driving transportation motor 41 stops (S1418, FIG. 15 (11)) and the form positioning member 20 is closed (S1419).

The ejected check P is thus prevented from dropping into the transportation path 15 on the upstream side by the second feed roller pair 22 and is held in the transportation path 15 on the downstream side so that it will not fall out from the multifunction device 10.

Removal of the check P is then detected based on the detection signal from the form ejection detector 24 (S1420). If the check P was removed, the first and second feed roller pairs 18, 22 open (S1421, FIG. 16) and the second process control mode ends.

As will be evident from the preceding description, a multifunction device 10 according to a preferred embodiment of the invention has a transportation path, 15 for guiding a check P, an MICR head 17 positioned along the transportation path 15 for reading MICR text prerecorded on the check P, front print head 23 positioned along the transportation path 15 for printing on the front of check P, back print head 21 positioned along the transportation path 15 for printing on the back of check P, and a scanner head 25 positioned along the transportation path 15 for scanning the printed side of the check P. Operations starting from reading MICR text and continuing to scanning the printed side of the check P can thus be performed as a continuous sequence of operations, thereby lightening the burden on the operator and shortening the required processing time.

As also described above, an insertion opening 12 from which the check P is inserted is formed at one end of the transportation path 15 and an exit opening 13 from which the check P is ejected is formed at the other end of the transportation path 15, the MICR head 17 is positioned on the insertion opening 12 side of the print heads 21, 23, and the scanner head 25 is positioned on the exit opening 13 side of the print heads 21, 23. The MICR reading process can therefore be performed as part of the process of conveying a check P placed in the insertion opening 12 into the multifunction device, and the check P can be ejected while being scanned in the scanning process. A short transportation path 15 can therefore be used, helping to make the multifunction device smaller and shortening the required processing time.

Furthermore, by forming a horizontally oriented insertion opening 12 so that a check P can be inserted substantially horizontally and forming a vertically oriented exit opening 13 so that the check P is ejected substantially vertically, the multifunction device can be made smaller than when the transportation path 15 is a straight path, and the processed check can be held using the vertically oriented end of the transportation path 15.

Furthermore, by providing scanner feed rollers 26 positioned opposite the scanner head 25 for transporting the check P while pressing it against the scanner head 25, and a roller retraction mechanism 32 for retracting the scanner feed rollers 26 from the scanner head 25 and opening the transportation path 15, the scanner feed rollers 26 can be retracted when the scanning process is not being run. It is therefore possible to avoid checks P being caught by the scanner feed rollers 26, thereby preventing jams and skips in the form feed pitch.

Furthermore, by providing a first process control mode whereby the check P is ejected after being scanned, a second process control mode whereby the check P is ejected without being scanned, and a mode selector switch 45 for selecting the first or second process control mode, the print medium can be selectively scanned according to the type of print media and customer desires while being able to continuously run a series of multiple processes including scanning. The mode selector switch 45 may be a panel button switch (FIG. 1) that may be selected by the operator and/or a software switch that may be set according to the type of media being processed, i.e. automatically set to print and scan (first process mode) for checks and automatically set to print only (second process mode) for roll paper receipts.

Furthermore, by transporting the check P toward the insertion opening 12 when printing with the print heads 21, 23, a sequence of processes can be run while transporting the check P back and forth in the transportation path 15. A short transportation path 15 can therefore be used and the multifunction device can be made smaller.

As will be appreciated from the preceding description the present invention lightens the burden on the operator and shortens the required processing time by performing check processing operations from MICR text reading to scanning the printed side of a check as a single continuous process.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A multifunction device comprising:

a transportation path that guides a print medium;

a magnetic head positioned along the transportation path that reads magnetic ink characters prerecorded on the print medium;

a first print head positioned along the transportation path that prints on a first side of the print medium;

a second print head positioned along the transportation path that prints on a second side of the print medium; and a scanner head positioned along the transportation path that scans one of the first side and the second side of the print medium.

2. A multifunction device as described in claim 1, further comprising an insertion opening formed at one end of the transportation path for inserting the print medium; and an exit opening formed at the other end of the transportation path for ejecting the print medium;

the magnetic head being positioned along the transportation path on the insertion opening side of the first and second print heads, and the scanner head being positioned along the transportation path on the exit opening side of the first and second print heads.

3. A multifunction device as described in claim 1, wherein the insertion opening is horizontally oriented so that the print medium can be inserted substantially horizontally, and the exit opening is vertically oriented so that the print medium can be ejected substantially vertically.

4. A multifunction device as described in claim 1, further comprising:

a pressure feed roller positioned opposite the scanner head that transports the print medium while pressing the print medium against the scanner; and a roller retraction mechanism that retracts the pressure feed roller away from the scanner head to open the transportation path.

5. A multifunction device as described in claim 1, further comprising:

a first process control unit that controls printing and scanning the print medium and then ejecting of the print medium;

a second process control unit that controls printing and ejecting the print medium without scanning; and a process selection unit that selects one of the first process control unit and the second process control unit.

6. A control method for a multifunction device having a transportation path that guides a print medium, a magnetic head positioned along the transportation path that reads magnetic ink characters prerecorded on the print medium, a first print head positioned along the transportation path that prints on a first side of the print medium, a second print head positioned along the transportation path that prints on a second side of the print medium, and a scanner head positioned along the transportation path that scans one of the first side and the second side of the print medium, the control method comprising:

reading the magnetic ink characters with the magnetic head while transporting the print medium inserted from an insertion opening toward an exit opening;

transporting the print medium to a first print head printing starting position after reading the magnetic ink characters;

printing on the first side of the print medium using the first print head while transporting the print medium in a direction along the transportation path;

transporting the print medium to a second print head printing start position after finishing printing with the first print head;

printing on the second side of the print medium using the second print head while transporting the print medium in a direction along the transportation path;

transporting the print medium to a scanning start position after finishing printing with the second print head; and scanning one of the first and the second side of the print medium with the scanner head while transporting the print medium toward the exit opening.

7. A multifunction device control method as described in claim 6, wherein the print medium is transported toward the insertion opening while printing with the first print head.

8. A multifunction device control method as described in claim 6, wherein the print medium is transported toward the insertion opening while printing with the second print head.

* * * * *